United States Patent [19]

Sternlieb

[11] Patent Number: 4,858,547
[45] Date of Patent: Aug. 22, 1989

[54] FABRIC HAVING SANDWICH STRUCTURE

[75] Inventor: Herschel Sternlieb, Brunswick, Me.

[73] Assignee: W. S. Libbey Co., Lewiston, Me.

[21] Appl. No.: 6,800

[22] Filed: Jan. 27, 1987

[51] Int. Cl.[4] ............................................... B32B 7/08
[52] U.S. Cl. .................................... 112/420; 428/102; 428/284; 428/286; 428/287; 428/293; 428/294; 428/297; 428/298; 428/340; 428/114
[58] Field of Search ............... 428/102, 284, 294, 286, 428/287, 293, 297, 298, 105, 107, 110, 114, 340; 112/420; 66/191, 192; 28/112

[56] References Cited

U.S. PATENT DOCUMENTS

| | | | |
|---|---|---|---|
| 4,309,472 | 1/1982 | Götting et al. | 428/229 |
| 4,416,929 | 11/1983 | Krueger | 428/110 |
| 4,426,414 | 1/1984 | Wilkerson | 428/284 |
| 4,445,951 | 5/1984 | Lind et al. | 428/102 |
| 4,550,045 | 10/1985 | Hutson | 428/102 |
| 4,748,996 | 6/1988 | Combrer | 428/114 |
| 4,756,942 | 7/1988 | Aichele | 428/114 |

*Primary Examiner*—James J. Bell
*Attorney, Agent, or Firm*—Cobrin, Feingertz & Gittes

[57] ABSTRACT

A fabric includes a first substrate layer; second substrate layer; the first and second substrate layers being at least translucent, being made from a non-woven fabric, and having a weight in the range between 0.25 ounces/yd.$^2$ and 8.0 ounces/yd.$^2$; a layer of filling material sandwiched between the first and second substrate layers, the layer of filling material including a plurality of substantially parallel, adjacent and spaced apart non-interwoven strands of yarn made of polypropylene, having a size in the range between 40 denier and 12,000 denier and running in a widthwise direction of the fabric between the first and second substrate layers; two opaque layers, one between the first substrate layer and the layer of filling material, and the other between the second substrate layer and the layer of filling material; and a stitching yarn having a size in the range between 40 denier and 1,000 denier and extending in a direction which is substantially transverse to the lengthwise direction, for securing together the first and second substrate layers, the two opaque layers and the layer of filling material.

16 Claims, 1 Drawing Sheet

FABRIC HAVING SANDWICH STRUCTURE

BACKGROUND OF THE INVENTION

The present invention relates generally to a fabric structure, and, more particularly, is directed to a fabric having particular use for vertical blinds.

When forming vertical blinds, for example, as shown and described in U.S. Pat. No. 4,309,472, a single layer of material is generally used. It is generally desirable, when forming such vertical blinds, to use a fabric made of polypropylene or the like, because of the extremely inexpensive nature thereof. However, polypropylene cannot be used in such formation because it degrades when subjected to ultraviolet light and it loses some physical properties—that is, it becomes tender and brittle. Also, a single layer of material may not provide sufficient light-blocking properties.

Fabrics are generally known in which a first type of material is sandwiched between two outer layers of material. Examples of such fabrics are shown and described in U.S. Pat. Nos. 3,025,199; 3,619,336; 3,647,061; 3,649,428; and 4,426,414. These fabrics are adhesively secured together, either by using a separate adhesive or by the adhesive nature of the materials of the different layers.

The three latter U.S. patents have their layers secured together by stitching. However, the sandwiched fabric in these latter U.S. patents is comprised of a cellular sheet material or a batt of self-bonding fibers extending in random directions throughout the batt. With these U.S. patents, the stitching extends in the lengthwise direction thereof.

A problem with all of the above arrangements, as applied to vertical blinds, is that there is a tendency for the elongated slats of the vertical blinds to cup—that is, the slats acquire curvature in the widthwise or transverse direction thereof. It therefore becomes necessary to provide support in such case in the widthwise direction to prevent such cupping action. Additionally, for the same reasons, it is necessary to prevent twisting of the slats in the widthwise direction thereof.

When forming vertical blinds, another problem that arises is that of forming an opaque effect, in which light is prevented from traveling through the slats. At the same time, it is desirable to provide a textural appearance to the slats or blinds and to have both sides thereof with the same appearance.

OBJECTS AND SUMMARY OF THE INVENTION

Accordingly, it is an object of the present invention to provide a fabric composed of at least three layers in a sandwiched configuration.

It is another object of the present invention to provide a fabric in which the intermediate layer is formed of a plurality of substantially parallel, adjacent and spaced apart strands of yarn running in a widthwise direction of the fabric between the first and second substrate layers, and the layers are secured together by a stitching yarn extending in a direction which is substantially transverse to the widthwise direction.

It is still another object of the present invention to provide a sandwich fabric construction that looks the same on both sides.

It is still another object of the present invention to provide a fabric that does not cup when used for vertical blinds.

It is yet another object of the present invention to provide a fabric that does not twist when used for vertical blinds.

It is a further object of the present invention to provide a sandwiched fabric in which the intermediate layer imparts a textural appearance to the surface of the outer substrate layers.

It is still a further object of the present invention to provide a sandwiched fabric in which the intermediate layer imparts a patterned appearance to the surface of the outer substrate layers.

It is yet a further object of the present invention to provide a sandwiched fabric that provides greater insulation when used for vertical blinds.

It is another object of the present invention to provide a sandwiched fabric which incorporates at least one opaque layer therein.

It is still another object of the present invention to provide a sandwiched fabric that can be used for vertical blinds, window shades, draperies, bedspreads, hospital cubical curtains and the like.

In accordance with an aspect of the present invention, a fabric includes a first substrate layer; a second substrate layer; the first and second substrate layers being at least translucent; a layer of filling material sandwiched between the first and second substrate layers, the layer of filling material including a plurality of substantially parallel, adjacent and spaced apart strands of yarn running in a widthwise direction of the fabric between the first and second substrate layers; and a stitching yarn extending in a direction which is substantially transverse to the widthwise direction, for securing together the first substrate layer, the second substrate layer and the layer of filling material.

In accordance with another aspect of the present invention, a fabric includes a first substrate layer; a second substrate layer; the first and second substrate layers being at least translucent, being made from a non-woven fabric, having a weight in the range between 0.25 ounces/yd.$^2$ and 8.0 ounces/yd.$^2$; a layer of filling material sandwiched between the first and second substrate layers, the layer of filling material including a plurality of substantially parallel, adjacent and spaced apart non-interwoven strands of yarn made of acrylic, polyester or polypropylene, having a size in the range between 40 denier and 12,000 denier and running in a widthwise direction of the fabric between the first and second substrate layers; two opaque layers, one between the first substrate layer and the layer of filling material, and the other between the second substrate layer and the layer of filling material; and a stitching yarn having a size in the range between 40 denier and 1,000 denier and extending in a direction which is substantially transverse to the widthwise direction, for securing together the first and second substrate layers, the two opaque layers and the layer of filling material.

The above and other objects, features and advantages of the present invention will become readily apparent from the following detailed description which is to be read in connection with the accompanying drawings.

DETAILED DESCRIPTION OF THE PREFERRED EMBODIMENTS

Figure 1:
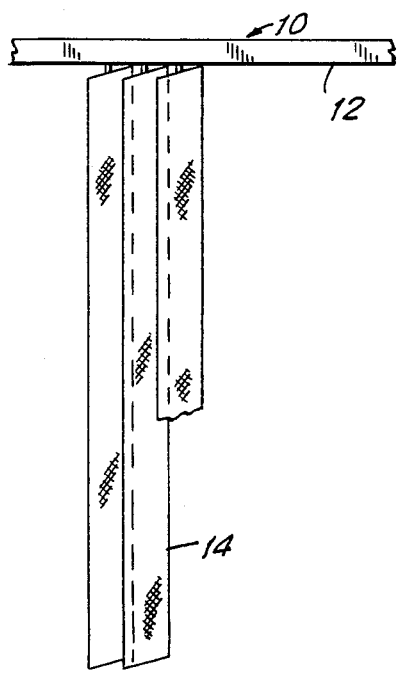
FIG. 1 is a front elevational view of a portion of a vertical blind, showing three slats with which the present invention can be used.

Referring to the drawings in detail, and initially to FIG. 1 thereof, a vertical blind 10 includes an upper horizontal support 12 secured to a wall or ceiling (not shown) for supporting a plurality of vertically extending, parallel slats 14 which can be used to protect against light, function as a room divider or the like. As shown, slats 14 are formed in elongated rectangular shapes, and are rotatable about longitudinal axes thereof to open and close the same, as is well known in the art.

Figure 2:
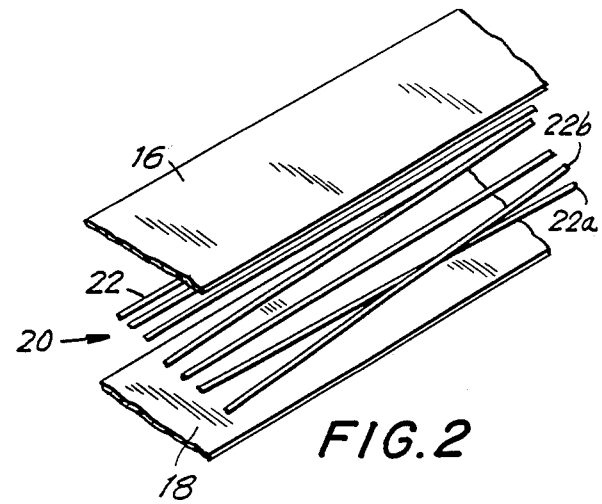
FIG. 2 is a perspective, blown-apart view of a fabric according to one embodiment of the present invention.
Figure 3:
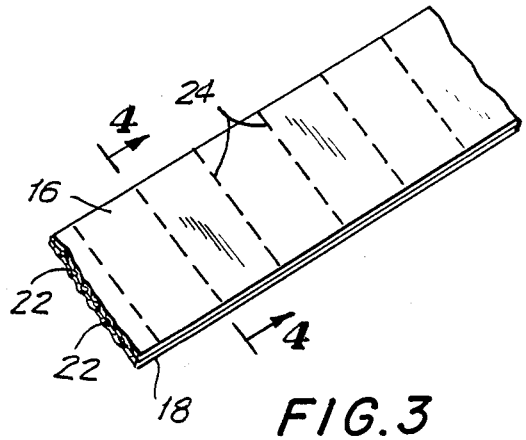
FIG. 3 is a perspective view of the fabric of FIG. 2 in assembled condition.
Figure 4:
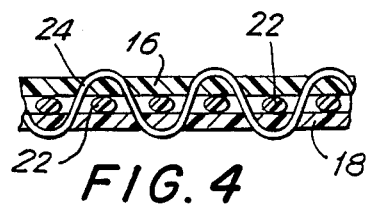
FIG. 4 is a cross-sectional view of the fabric of FIG. 3, taken along line 4—4 thereof.

In accordance with the present invention, as shown in FIGS. 2-4, slat 14 is formed by a first substrate layer 16 and a second substrate layer 18 arranged in overlapping and parallel relation to the first substrate layer 16. Each of the first and second substrate layers 16 and 18 are at least translucent, and may be transparent. It is preferable, although it is not necessary, that the first and second substrate layers 16 and 18 be made of the same non-woven fabric, having a weight in the range between 0.25 ounces/yd.$^2$ and 8.0 ounces/yd.$^2$.

An intermediate layer 20 of filling material is sandwiched between first and second substrate layers 16 and 18. More particularly, intermediate layer 20 is formed by a plurality of substantially parallel, adjacent, and spaced apart strands of yarn 22 running in the widthwise direction of each slat 14 between first and second substrate layers 16 and 18. In actuality, strands 22 can partially overlap each other, and such overlapping is intended within the meaning of substantially parallel.

Strands 22 are preferably made of acrylic or polyester but can also be made of polypropylene or other fibers. Since strands 22 are sandwiched between first substrate layer 16 and second substrate layer 18, strands 22 will be protected to a large degree from degradation due to ultraviolet light. The size range of strands 22 is between 40 denier and 12,000 denier. If desired, strands 22 can have different colors. For example, strand 22a can have a red color, while strand 22b has a blue color. Because of the translucent nature of first substrate layer 16 and second substrate layer 18, each slat 14 will be imparted with a patterning, while also exhibiting a textured appearance.

In order to secure together first substrate layer 16, second substrate layer 18 and intermediate layer 20, a stitching yarn 24 is used, which is stitched in a direction which is substantially transverse to the widthwise direction of slats 14. Stitching yarn 24 is preferably formed from a spun yarn or a filament yarn, having a size in the range between 40 denier and 1,000 denier. Any suitable stitching pattern can be used, such as a chain pattern, a tricot pattern, two-bar pattern or the like. However, because of the individual strands of yarn 22 that are used, stitching yarn should extend in a direction substantially transverse to the widthwise direction thereof, as aforementioned.

With this arrangement, the intermediate layer 20 can be used, which imparts an aesthetically pleasing textured and patterned appearance to slats 14, while also increasing the insulation properties of vertical blind 10. In addition, there is no need to use an adhesive to secure the different layers together, since this is accomplished with the aforementioned stitching patterns. Further, because of this balanced arrangement, the fabric that forms slats 14 does not cup or twist.

Still further, because of layers 16 and 18 being identical, the fabric has the same appearance on both sides.

Figure 5:
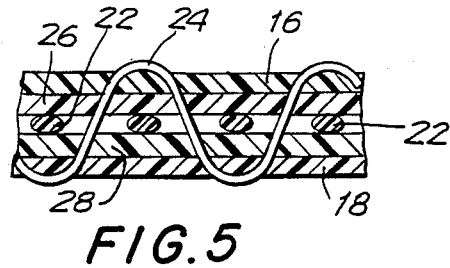
FIG. 5 is a cross-sectional view of fabric according to another embodiment of the present invention.

In accordance with another aspect of the present invention, as shown in FIG. 5, an opaque layer 26 is sandwiched between intermediate layer 20 and first substrate layer 16, and an opaque layer 28 is sandwiched between intermediate layer 20 and second substrate layer 18. With this modification, when vertical blind 10 is closed, the room is darkened and there is no need for additional shades.

It will be appreciated that, although the present invention has been illustrated as being used with a vertical blind 10, it can be used for other purposes, such as for window shades, draperies, bedspreads, hospital cubical curtains and the like.

Having described specific preferred embodiments of the invention with reference to the accompanying drawings, it will be appreciated that the present invention is not limited to those precise embodiments, and that various changes and modifications can be effected therein by one of ordinary skill in the art without departing from the spirit or scope of the invention as defined in the appended claims.

| GLOSSARY | |
|---|---|
| Reference Numeral | Description |
| 10 | vertical blind |
| 12 | support |
| 14 | slats |
| 16 | first substrate layer |
| 18 | second substrate layer |
| 20 | intermediate layer of filling material |
| 22 | strands of yarn |
| 24 | stitching yarn |
| 26 | opaque layer |
| 28 | opaque layer |

What is claimed is:

1. A fabric having a lengthwise direction, said fabric comprising:
   a first substrate layer extending in said lengthwise direction;
   a second substrate layer extending in said lengthwise direction;
   said first and second substrate layers being at least translucent;
   a layer of filling material sandwiched between said first and second substrate layers, said layer of filling material including a plurality of substantially parallel, adjacent and spaced apart strands of yarn running in said lengthwise direction of said fabric between said first and second substrate layers; and
   a stitching yarn extending in a direction which is substantially transverse to said lengthwise direction, for securing together said first substrate layer, said second substrate layer and said layer of filling material.

2. A fabric comprising:
   a first substrate layer made from a non-woven fabric;
   a second substrate layer made from a non-woven fabric;

said first and second substrate layers being at least translucent;

a layer of filling material sandwiched between said first and second substrate layers, said layer of filling material including a plurality of substantially parallel, adjacent and spaced apart strands of yarn running in a lengthwise direction between said first and second substrate layers; and a stitching yarn extending in a direction which is substantially transverse to said lengthwise direction, for securing together said first substrate layer, said second substrate layer and said layer of filling material.

3. A fabric according to claim 2, wherein the weight of said first and second substrate layers is in the range between 0.25 ounces/yd.$^2$ and 8.0 ounces/yd.$^2$.

4. A fabric according to claim 1, wherein said first and second substrate layers are transparent.

5. A fabric according to claim 1, wherein said first and second substrate layers are made of the same type of fiber.

6. A fabric comprising:
a first substrate layer;
a second substrate layer;
said first and second substrate layers being at east translucent;
a layer of filling material sandwiched between said first and second substrate layers, said layer of filling material including a plurality of substantially parallel, adjacent and spaced apart strands of yarn running in a lengthwise direction between said first and second substrate layers, said strands of yarn being substantially non-interwoven; and
a stitching yarn extending in a direction which is substantially transverse to said lengthwise direction, for securing together said first substrate layer, said second substrate layer and said layer of filling material.

7. A fabric according to claim 1, wherein said strands of yarn have different colors.

8. A fabric according to claim 1, wherein said strands of yarn are made from one material selected from acrylic, polyester, polypropylene, or other fibers.

9. A fabric according to claim 1, wherein said strands of yarn have a size in the range between 40 denier and 12,000 denier.

10. A fabric according to claim 1, wherein said strands of yarn are formed from one of:
(a) a spun yarn; and
(b) a filament yarn.

11. A fabric according to claim 1, wherein said stitching yarn has a size in the range between 40 denier and 1,000 denier.

12. A fabric according to claim 1, wherein said stitching yarn is formed from one of:
(a) a spun yarn; and
(b) a filament yarn.

13. A fabric according to claim 1, wherein said stitching yarn secures together said first substrate layer, said second substrate layer and said layer of filling material with one of:
(a) a chain pattern;
(b) a tricot pattern; and
(c) a two-bar pattern.

14. A fabric according to claim 1, further including at least one opaque layer sandwiched between said first and second substrate layers.

15. A fabric according to claim 1, wherein there are two opaque layers, one between said first substrate layer and said layer of filling material, and the other between said second substrate layer and said layer of filling material, and said stitching yarn secures together said first and second substrate layers, said two opaque layers and said layer of filling material.

16. A fabric comprising:
a first substrate layer;
a second substrate layer;
said first and second substrate layers being at least translucent, being made from a non-woven fabric, and having a weight in the range between 0.25 ounces/yd.$^2$ and 8.0 ounces/yd.$^2$;
a layer of filling material sandwiched between said first and second substrate layers, said layer of filling material including a plurality of substantially parallel, adjacent and spaced apart non-interwoven strands of yarn made of polypropylene, having a size in the range between 40 denier and 12,000 denier and running in a widthwise direction between said first and second substrate layers;
two opaque layers, one between said first substrate layer and said layer of filling material, and the other between said second substrate layer and said layer of filling material; and
a stitching yarn having a size in the range between 40 denier and 1,000 denier and extending in a direction which is substantially transverse to said lengthwise direction, for securing together said first and second substrate layers, said two opaque layers and said layer of filling material.

* * * * *